United States Patent
Bidner et al.

(10) Patent No.: US 6,778,898 B1
(45) Date of Patent: *Aug. 17, 2004

(54) COMPUTER CONTROLLER FOR VEHICLE AND ENGINE SYSTEM WITH CARBON CANISTER VAPOR STORAGE

(75) Inventors: David Karl Bidner, Livonia, MI (US); Gopichandra Surnilla, West Bloomfield, MI (US); Yonghua Li, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/248,760

(22) Filed: Feb. 14, 2003

(51) Int. Cl.$^7$ .............................. G06F 17/00; B60T 7/12
(52) U.S. Cl. ..................... 701/109; 123/674; 60/274; 60/276
(58) Field of Search .................................. 701/109, 101, 701/115, 103, 108; 123/443, 492, 674, 493, 480, 672; 60/274, 276, 283, 285, 297

(56) References Cited

U.S. PATENT DOCUMENTS

| | | | |
|---|---|---|---|
| 5,048,492 A | 9/1991 | Davenport et al. | 123/489 |
| 5,048,493 A | 9/1991 | Orzel et al. | 123/489 |
| 5,090,388 A | 2/1992 | Hamburg et al. | 123/489 |
| 5,190,008 A | 3/1993 | Yamasaki et al. | 123/406.47 |
| 5,224,462 A | 7/1993 | Orzel | 123/698 |
| 5,245,978 A | 9/1993 | Orzel | 123/674 |
| 5,497,745 A | 3/1996 | Cullen et al. | 123/339.11 |
| 5,613,481 A | 3/1997 | Kitagawa et al. | 123/698 |
| 5,655,507 A | 8/1997 | Kawasaki | 123/674 |
| 5,676,118 A | 10/1997 | Saito | 123/679 |
| 5,699,778 A | 12/1997 | Muraguchi et al. | 123/698 |
| 5,735,255 A | 4/1998 | Farmer et al. | 123/520 |
| 5,765,541 A | 6/1998 | Farmer et al. | 123/674 |
| 6,308,697 B1 * | 10/2001 | Surnilla et al. | 123/672 |
| 6,427,437 B1 * | 8/2002 | Bidner et al. | 60/274 |

* cited by examiner

Primary Examiner—Willis R. Wolfe
Assistant Examiner—Johnny H. Hoang
(74) Attorney, Agent, or Firm—Allan J. Lippa

(57) ABSTRACT

A method is described for controlling fuel vapor purging and adaptive learning in a lean burn engine system. Fuel vapor purging is carried out during lean operating conditions to minimize impact on vehicle emissions, while adaptive learning is carried out during near stoichiometric conditions (oscillations around stoichiometry). This allows faster fuel vapor purging and additional adaptive learning opportunity.

12 Claims, 14 Drawing Sheets

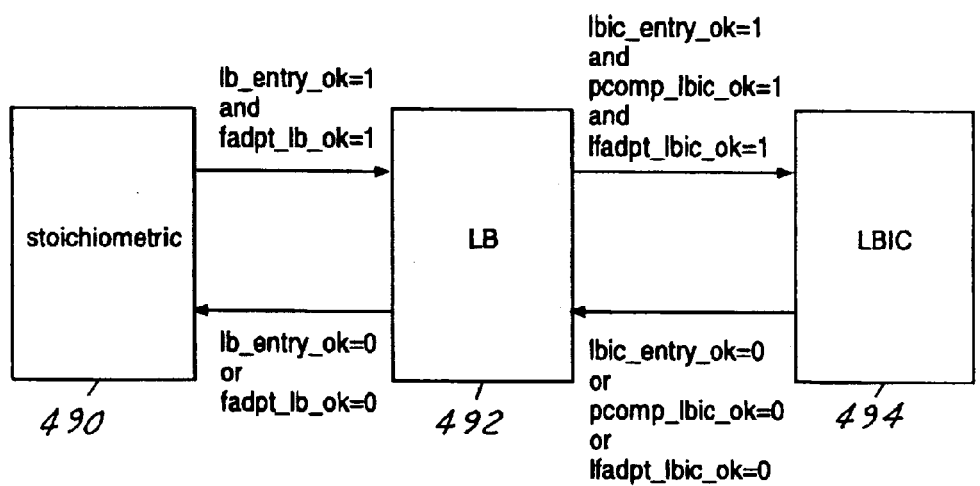

lb_entry_ok: lean burn operation ok to go;

lbic_entry_ok: lean burn with injector cutout operation ok to go;

fadpt_lb_ok: fadpt condition allows LB opation;

pcomp_lbic_ok: canister vapor condition allows LBIC operation;

ifadpt_lbic_ok: lean fadpt condition allows LBIC operation;

Stoichiometric:     fuel adaptive (HEGO), pcomp (HEGO)
Lean Burn (LB):     lean fuel adaptive (UEGO), pcomp (UEGO), fuel economy
Lean Burn with injector Cutout (LBIC):     even better fuel economy

FIG. 4D

Parameters:
adpt_tmr
ADP_TM_MAX
tank_p
ADP_TM
CAL_TANK_PRES_MAX
pcomp_ppm
PCOMP_PPM_SAFE
fadpt_ready
tsladpt_tmr_s
CAL_FADPT_S

COMPUTER CONTROLLER FOR VEHICLE AND ENGINE SYSTEM WITH CARBON CANISTER VAPOR STORAGE

BACKGROUND OF INVENTION

1. Field of the Invention

This invention relates to a method and system for controlling fuel vapor purging of a lean burn engine in addition to performing adaptive learning at near stoichiometric operation.

2. Background of the Invention

Engine fuel systems typically contain a canister for collecting fuel vapors produced in the fueling system. Periodically, these fuel vapors are passed through to the engine and burned during engine combustion. In this way, the generated fuel vapors are utilized by the engine and emissions are decreased.

Engines also contain adaptive learning methods to learn air flow sensor and fuel injector variations. These sensors and actuators can vary from engine to engine, and can also vary over time. These adaptive methods are used to learn this variation and take corrective action.

One approach to incorporating fuel vapor purging and adaptive learning into a lean burn engine discontinues lean operation when fuel vapor purging is requested since this allows learning of the fuel vapor concentration.

In another example, fuel vapors are periodically purged from a fuel system into an engine's air/fuel intake. A measurement of the massive inductive fuel vapors is provided by a purge compensation signal is derived from an exhaust gas oxygen sensor output. Lean air/fuel operation is enabled when the purge compensation signal is below a predetermined value. Such a system is described in U.S. Pat. No. 5,735,255.

However, the present inventors have recognized a disadvantage with such approaches. In particular, since adaptive learning is also performed during stoichiometric operation, there is limited ability to learn both the fuel vapor concentration and the air and fuel adaptive errors. In particular, air and fuel adaptive errors, as well as changes in fuel vapor concentration, affect the engine exhaust sensors in similar ways. As such, during stoichiometric operation, it is generally possible to only perform one at a time, thereby providing only limited operating time for each. This can lead to degraded fuel vapor control, as well as degraded adaptive learning. Furthermore, fuel vapor purging performed during lean and high load operation can give degraded performance since all of the fuel vapors may not be burned during such high load lean operation.

SUMMARY OF INVENTION

The above disadvantages are overcome by a method for an internal combustion engine coupled to an emission control device and a sensor, the method comprises: operating the engine lean with periodic rich operating durations; during said lean operation with periodic rich operation, learning a fuel vapor amount based on the sensor, wherein fuel vapor is combusted in the engine at least during a part of the lean and rich operation; operating the engine at near stoichiometric operating conditions; and during said stoichiometric conditions, learning adaptive data.

By performing the fuel vapor purging during the lean/rich operating conditions, while performing adaptive learning during stoichiometric conditions, it is possible to provide sufficient time to achieve accurate adaptive learning and accurate fuel vapor learning. Further, an added advantage is that any errors in the fuel vapor concentration during the lean operation, thereby causing an error in the engine air-fuel ratio, provides only a minimal impact since high accuracy air-fuel ratio control is not required during lean operation (i.e., the primary emission is NOx, which is being stored in the emission control device). Still further, an added advantage is that when there is no need to perform fuel vapor purging and adaptive learning, it is possible to run the engine with a reduced number of cylinders, thus further reducing pumping losses and improving fuel economy.

In another aspect of the invention, the above disadvantages are overcome by a system. The system comprises an emission control device capable of storing NOx during at least some operating conditions; and a controller programmed to operate an engine lean at least during a light load operation; during at least a portion of said lean operation, operate the engine to induct fuel vapors; and while inducting said fuel vapors, switching the engine to stoichiometric or rich operation to react NOx stored in said emission control device.

By using an emission control device that can store NOx during certain operating conditions, one can operate lean while combusting fuel vapors without having to stop the fuel vapor purging when transitioning to stoichiometric or rich operation. Also, any changes in the fuel vapor concentration provide only a minimal impact since the engine is operating lean of stoichiometry.

In other words, the present inventors have recognized that if fuel vapors are inducted during certain lean operating conditions, emissions are less susceptible to sudden changes in the fuel vapor concentration due to fuel tank sloshing. Also, because of this reduced sensitivity, it is possible to rapidly open or close the fuel vapor purging valve, thereby allowing quicker fuel vapor purging. Further still, feedback can be used to adjust and check fuel to maintain the desired air-fuel ratio, as well as the desired engine output torque.

DETAILED DESCRIPTION

Figure 1:
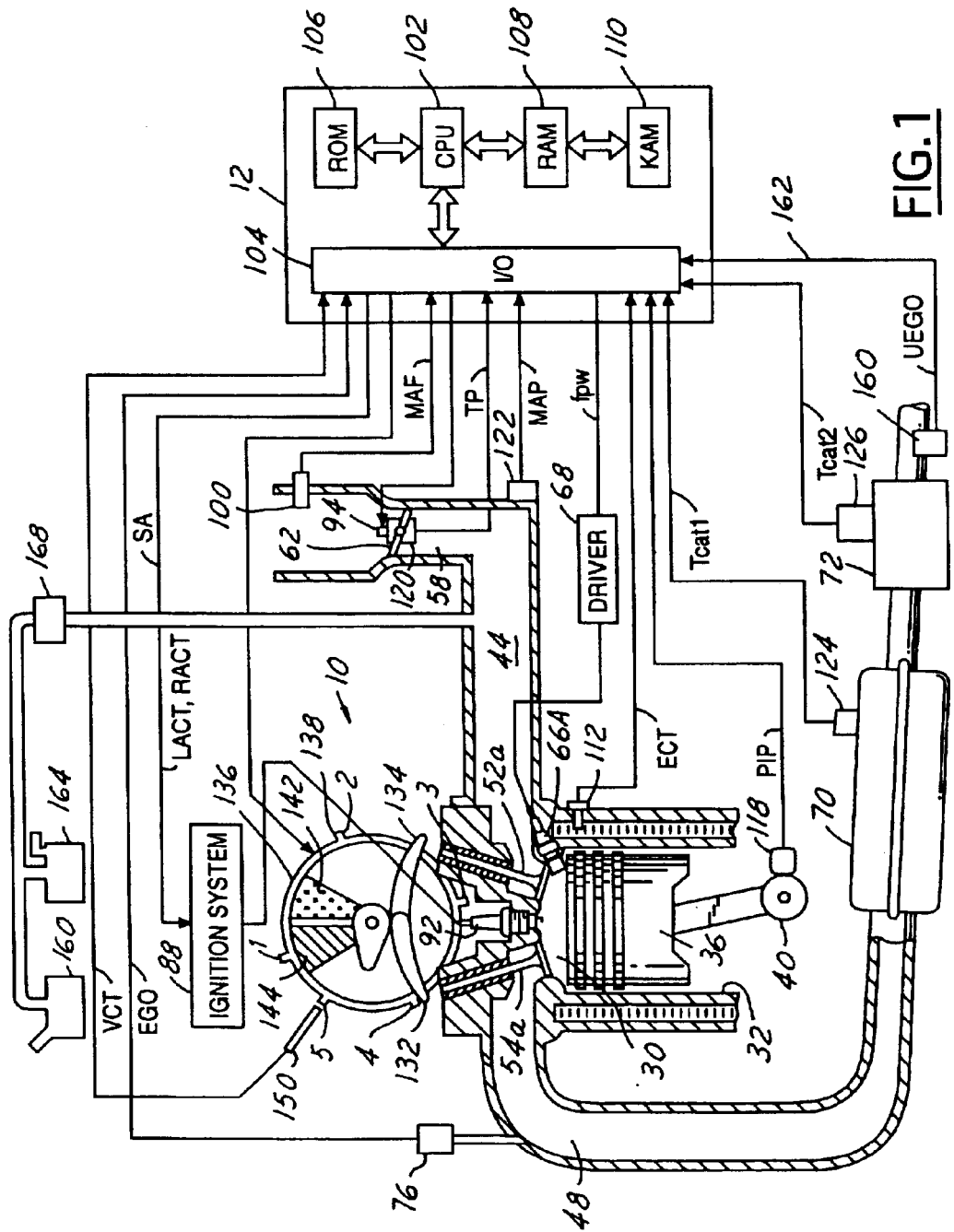
FIG. 1 is a block diagram of an engine for use with various embodiments of the present invention.

FIG. 1 shows one cylinder of a multi-cylinder engine, as well as the intake and exhaust path connected to that cylinder.

Continuing with FIG. 1, direct injection spark ignited internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized advantageously during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor (UEGO), a two-state oxygen sensor (HEGO or EGO), or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Emission control device 72 can be various types of devices, such as a three-way catalyst known as a nitrogen oxide (NOx) adsorbent or trap. Device 72 is shown positioned downstream of device 70. Device 72 is a three-way catalyst that absorbs NOx when engine 10 is operating lean of stoichiometry. The absorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from device 72, or during a vapor purge cycle to recover fuel vapors from fuel tank 160 and fuel vapor storage canister 164 via purge control valve 168 (as described below), or during operating modes requiring more engine power, or during operation modes regulating temperature of the omission control devices such as device 70 or 72. (Again, note that emission control devices 70 and 72 can correspond to various devices such as three way catalysts, or other types of catalytic converters.) Further, canister 164, in one embodiment, is a charcoal carbon canister.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give and indication of engine load. Further, this sensor, along with engine speed, can provide an estimate of charge (including air) inducted into the cylinder. In a preferred aspect of the present invention, sensor 118, which is also used as an engine speed sensor, produces a predetermined number of equally spaced pulses every revolution of the crankshaft.

In this particular example, temperature Tcat1 of catalytic converter 70 and temperature Tcat2 of device 72 are inferred from engine operation as disclosed in U.S. Pat. No. 5,414, 994, the specification of which is incorporated herein by reference. In an alternate embodiment, temperature Tcat1 is provided by temperature sensor 124 and temperature Tcat2 is provided by temperature sensor 126.

Continuing with FIG. 1, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of oxygen concentration in the exhaust gas. In one example, sensor 160 is a UEGO sensor that provides signal UEGO to controller 12.

As described above, FIG. 1 merely shows one cylinder of a multi-cylinder engine, and that each cylinder has its own set of intake/exhaust valves, fuel injectors, spark plugs, etc.

Also, in each embodiment of the present invention, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in each embodiment, an exhaust gas recirculation (EGR) System routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within one air-fuel ratio of the stoichiometric air-fuel ratio. Engine 10 can also be operated in an injector cut-out mode as described below herein. In particular, in this mode, fuel is provided to some of the cylinders, but not others, even though all of the cylinders are pumping air from intake manifold 44 to exhaust manifold 48.

As described below, feedback air-fuel ratio is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used if desired.

Also note that various methods can be used according to the present invention to maintain the desired torque such as, for example, adjusting ignition timing, throttle position, variable cam timing position, and exhaust gas recirculation amount. Further, these variables can be individually adjusted for each cylinder to maintain cylinder balance among all the cylinder groups.

Note that in an alternative embodiment, engine 10 can be a port injected engine where injector 66A is positioned in manifold 44, rather than in the combustion chamber 30. Such a port injected engine can operated rich, near stoichiometric, or lean in a homogenous mode. For this embodiment, the fuel system is not required to be a high pressure system, but can utilize a fuel pump, fuel rail, and pressure regulator to provide pressurized fuel to injector 66.

The routines described in the following Figures manage engine operation, taking into account lean burn conditions, lean burn with injector cut-out (i.e., some cylinders operating lean with other cylinders inducting air with substantially no injected fuel), and closed loop adaptive algorithms to compensate for fuel injector and/or air metering errors. The routines attempt to provide increased fuel economy while balancing activities related to fuel system learning and canister purging.

The following definitions are used:
PCOMP—Canister Purge Compensation feature (see FIG. 6)
FADPT—Stoichiometric closed loop sensor (HEGO or UEGO) long term adaptive feature (see FIG. 5)
LADPT—lean burn adaptive feature (see FIG. 5)
LB—is overall total exhaust lean, including:
LBIC—lean burn injector cut-out, and
LBV8—all cylinders lean, (in this case for the example of a V-8 type engine).
LB/LBIC and Canister Purge (PCOMP) modes:
1) PCOMP (stoichiometric or LBV8) and FADPT (stoichiometric closed loop HEGO adaptive) are generally conducted at different times;
2) FADPT (stoichiometric closed loop HEGO adaptive) and LADPT (LB closed loop UEGO adaptive) are generally conducted at different times;
3) LBIC and PCOMP are generally conducted at different times to minimize lost fuel economy;
4) LB and FADPT (stoichiometric closed loop HEGO adaptive) are generally conducted at different times;
5) PCOMP (LB) and LADPT (LB closed loop UEGO adaptive) are generally conducted at different times;
6) PCOMP can run during lean or stoichiometric conditions because feed back can come from either the UEGO or HEGO sensor;

7) LADPT (LB closed loop UEGO adaptive) has a low priority because it has a small effect on emissions compared with PCOMP and FADPT;

8) With increased NOx storage capacity, the FADPT routine can be run early in order to allow completion while NOx storage catalytic elements are warming up in temperature and efficiency;

9) With decreased NOx storage capacity (where lean operation is limited to a certain temperature window and engine airflow space velocity) FADPT can be completed later;

10) During normal operating conditions, FADPT can be engaged based on a timer if lean conditions should prevail too long;

11) During normal operating conditions, stoichiometric FADPT is interrupted by PCOMP if tank pressure is greater than a preselected threshold, or time since last fuel vapor purging is too long;

12) During normal operating conditions, LBIC is interrupted by PCOMP if tank pressure is greater than a preselected threshold, or time since last fuel vapor purging is too long;

13) LB mode is allowed if FADPT is not ready to run;

14) LBIC stoichiometric operation and FADPT are generally not run at the same time, unless the cylinder arrangement allows stoichiometric isolation for the HEGO; and 15) The UEGO signal is used with a threshold to control the PCOMP ramp rate.

These modes will be better understood when read together with the specific algorithms described in the following flow charts.

In general terms, the PCOMP routine adjusts engine fuel injection to account for fuel vapors inducted from the fuel tank and canister system. The following equations illustrate how the purge compensation (PCOMP) adjusts the required injected fuel calculation:

$$fuel\_bk\_temp = (CYL\_AIR\_CHG) \times (KAMREF)/(14.64 \times LAM\_FINAL) - PCOMP\_LBM + TFC\_HR$$

Where: CYL_AIR_CHG=Current cylinder air charge (sum of MAF and purge air flow)
LAM_FINAL=Equivalence ratio
PCOMP_LBM=Fuel compensation from PCOMP logic
TFC_HR=Fuel compensation from Transient Fuel logic
fuel_bk_temp=Fuel mass required per bank The following represent adaptation and learning parameters:
KAMREF=long term adaptive, stoich HEGO
LBKAMREF=long term adaptive, lean burn UEGO
PCOMP_LBM=learned fuel content in purge flow For stoichiometric FADPT:

$$fuel\_bk\_temp = (CYLAIR\_CHG) \times (KAMREF)/(14.64 \times LAM\_FINAL) - PCOMP\_LBM + TFC\_HR$$

For stoichiometric PCOMP:

$$fuel\_bk\_temp = (CYL\_AIR\_CHG) \times (KAMREF)/(14.64 \times LAM\_FINAL) - PCOMP\_LBM + TFC\_HR$$

For LB LADPT:

$$fuel\_bk\_temp = (CYL\_AIR\_CHG) \times (LBKAMREF)/(14.64 \times LAM\_FINAL) - PCOMP\_LBM + TFC\_HR$$

For LB PCOMP:

$$fuel\_bk\_temp = (CYL\_AIR\_CHG) \times (LBKAMREF)/(14.64 \times LAM\_FINAL) - PCOMP\_LBM + TFC\_HR$$

Thus, the above equations illustrate for each of the various modes how the adaptive learning values and vapor purge compensation affect the requested fuel to be injected into the engine.

Next, the interaction between PCOMP and FADPT is generally described. At engine start up, if ECT (engine coolant temperature) is suitable for PCOMP (i.e., temperature greater than a threshold value), the controller will start PCOMP. Otherwise, PCOMP is not enabled for the first PIP. FADPT will not start directly after an engine start because it operates more effectively with ECT stabilized for a calibrated period of time. PCOMP is an adaptive routine. Fuel injection is controlled based on the estimated purge fuel, while purge air is calculated in air charge estimation. Generally, injected fuel is obtained by subtracting purge fuel from desired fuel based on air charge estimation, as described in the equations above.

Figure 2:
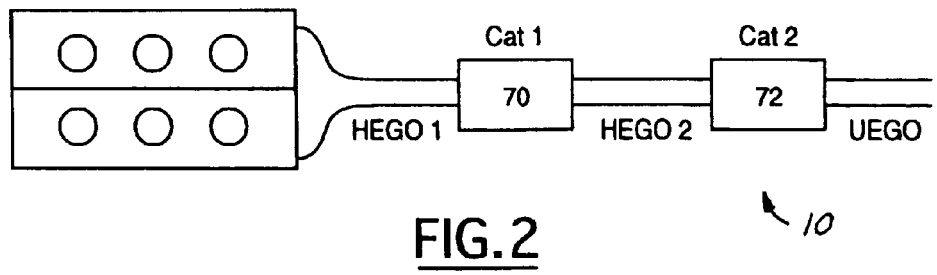
FIG. 2 is a simplified block diagram of an example embodiment of an engine and exhaust system.

Referring now to FIG. 2, a general block diagram is now described. This block diagram shows a particular embodiment of engine 10 as a six cylinder V-type engine with catalysts 70 and 72 arranged in parallel. Further, in this example, three oxygen type sensors are utilized (HEGO1, HEGO2, and UEGO). Note that in an alternative embodiment, three HEGO sensors can be used, or three UEGO sensors, or any other combination of the two types of sensors. Further, less than 3 sensors can be utilized.

Figure 3:
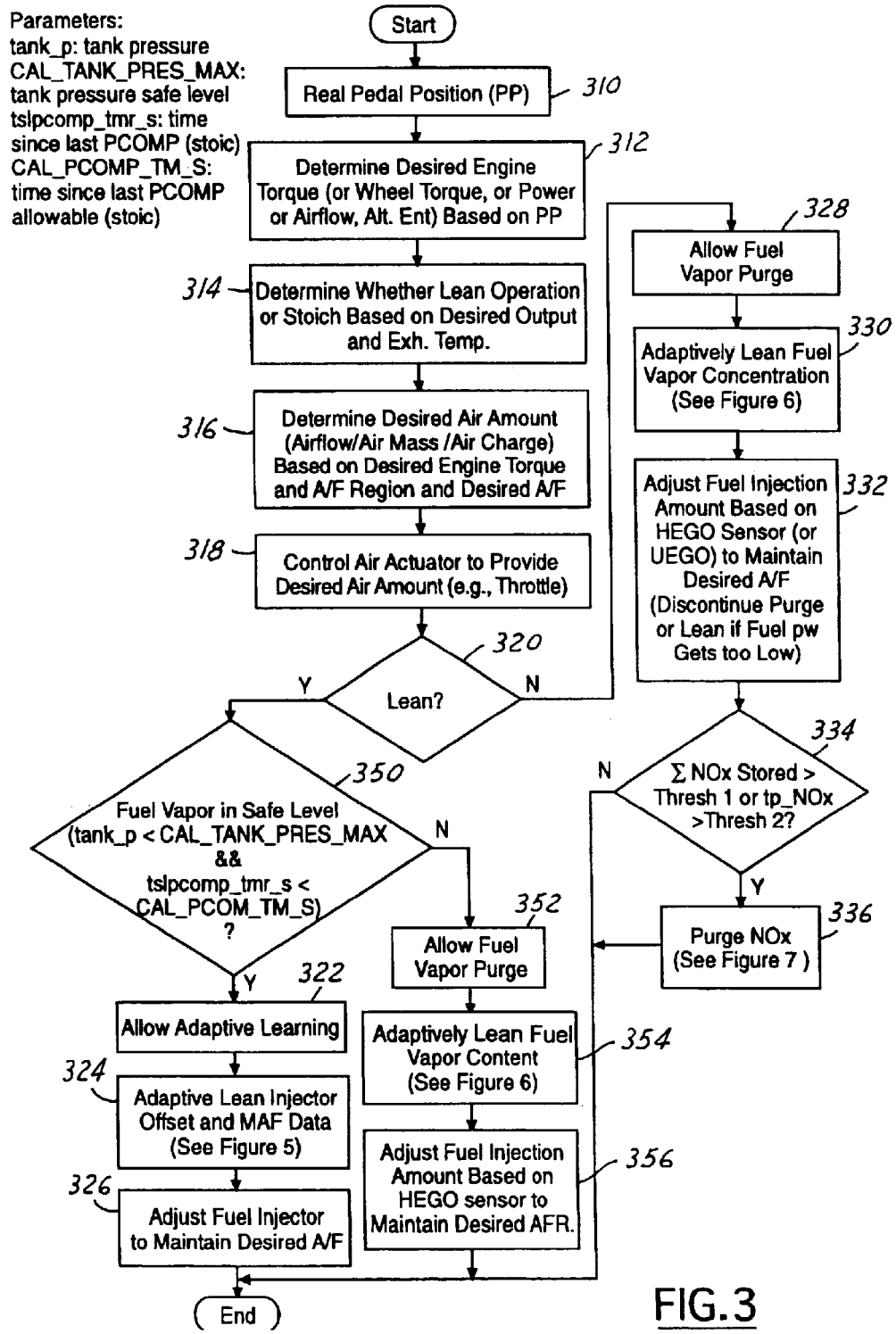

Referring now to FIG. 3, a routine is described for enabling adaptive learning and fuel vapor purging. First, in step 310, the routine reads the pedal position (pp). Then, in step 312, the routine determines a desired engine torque based on the pedal position. In an alternative embodiment, the desired engine torque can be based on pedal position and engine speed. And still an alternative embodiment, the routine can utilize desired wheel torque, desired engine power, or desired engine airflow.

From step 312, the routine continues to step 314. In step 314, the routine determines whether lean operation or stoichometric operation is desired based on the desired engine output torque and exhaust temperature. In particular, as described in FIG. 4, the engine air-fuel operating mode is selected based on a torque speed basis. For low torque low speed, lean operation is desired. For mid torque mid speed regions, stoichiometric operation is desired. For high torque operation, a rich engine air-fuel ratio is scheduled.

Next, in step 316, the routine determines a desired air amount (desired air flow, air mask or air charge) based on the desired engine torque and the air-fuel region. Further, the specific desired air-fuel ratio is also utilized to determine the desired air amount. Next, in step 318, the routine controls the air actuated to provide the desired air amount. For example, in the case of an electronic throttle system, the routine determines a desired throttle position to provide the desired air amount. Further, feedback from a mass air flow sensor can be used to adjust the throttle position.

Next, the routine continues to step 320 and determines whether the lean operating mode is requested. When the answer to step 320 is no, the routine continues to step 350, where fuel vapor safety condition is checked by comparing tank pressure with a calibrated value, and time since last fuel vapor purging to another calibrated value. If the answer to step 350 is yes, the routine continues to step 322 and allows, or enables, adaptive learning of the fuel injector offsets and air meter biases. In particular, in step 324, the routine adaptively learns the injector offsets and mass air flow data as described later herein with particular reference to FIG. 5. Next, in step 326, the routine adjusts the fuel injection amount to maintain the desired air-fuel ratio. In particular, the routine adjusts the fuel injection amount based on measurements from exhaust gas oxygen sensors located upstream and/or downstream of an emission control device. These exhaust gas oxygen sensors can be either a switching type EGO, or linear type UEGO. When the answer to step 350 is no, the routine continues to step 352 and allows fuel vapor purging. Next, in step 354, the routine adaptively learns fuel vapor content (HEGO based, see FIG. 6), and in step 356, adjusts fuel injection amount based on HEGO sensor to maintain desired air fuel ratio.

When the answer to step 320 is yes, the routine continues to step 328 to allow fuel vapor purging. Next, in step 330 the routine adaptively learns the fuel vapor concentration coming from the carbon canister as described below herein with particular reference to FIG. 6A. Next, in step 332, the routine adjusts the fuel injection amount based on exhaust gas oxygen sensors to maintain the desired air-fuel ratio. Note that if the fuel injector pulse widths required to maintain the desired air-fuel ratio during the fuel vapor for purging becomes too small, the routine either discontinues lean operation, or discontinues fuel vapor purging.

From step 332, the routine continues to step 334 where a determination is made as to whether the amount of stored NOx is greater than a threshold. Alternatively, the routine can determine whether a tailpipe amount of NOx is greater than a second threshold. Further still, the routine can determine whether an amount of tailpipe NOx per distance traveled is greater than a third threshold. When the answer to step 334 is yes, the routine continues to step 336 and changes operation from lean to stoichiometric, from rich to purge the NOx stored in the emission control device as described below herein with respect to FIG. 7.

Figure 4:
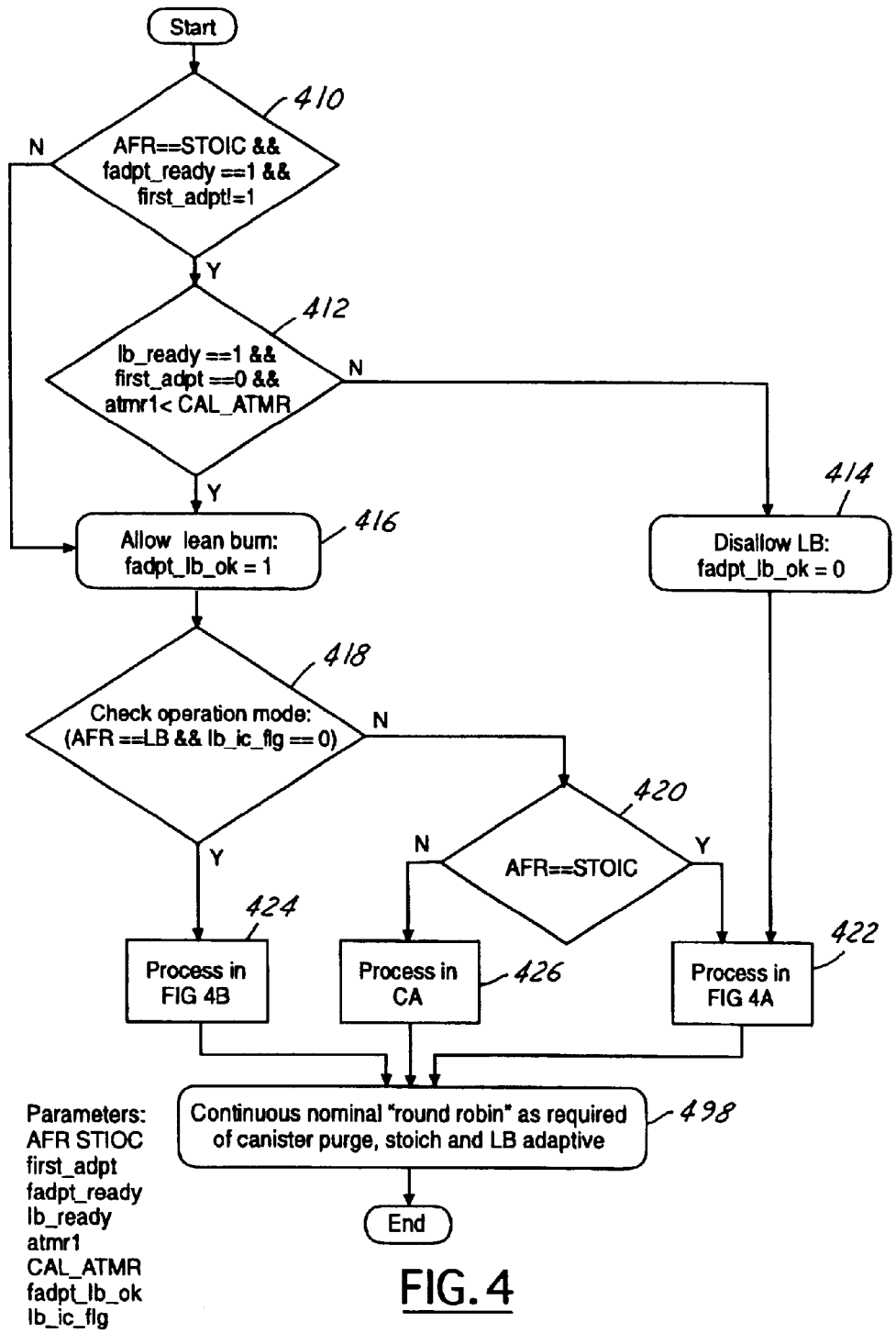
FIGS. 4–4D are high level flowcharts, while FIGS. 4E and F4 are graphs showing operating according to an embodiment of the invention.

Note that the high level management described in FIG. 4 is an alternative embodiment to the overall engine management described in FIG. 3.

Referring now to FIG. 4, a high level flow chart for managing lean burn operation, injector cutout operation, stoichiometric long term HEGO adaptive fuel, and lean burn long term adaptive UEGO, and stoichiometric or lean burn canister purging. This routine manages whether to allow lean, or injector cutout, operation, as well as whether to enable canister purging or adaptive fuel learning.

Figure 4A:
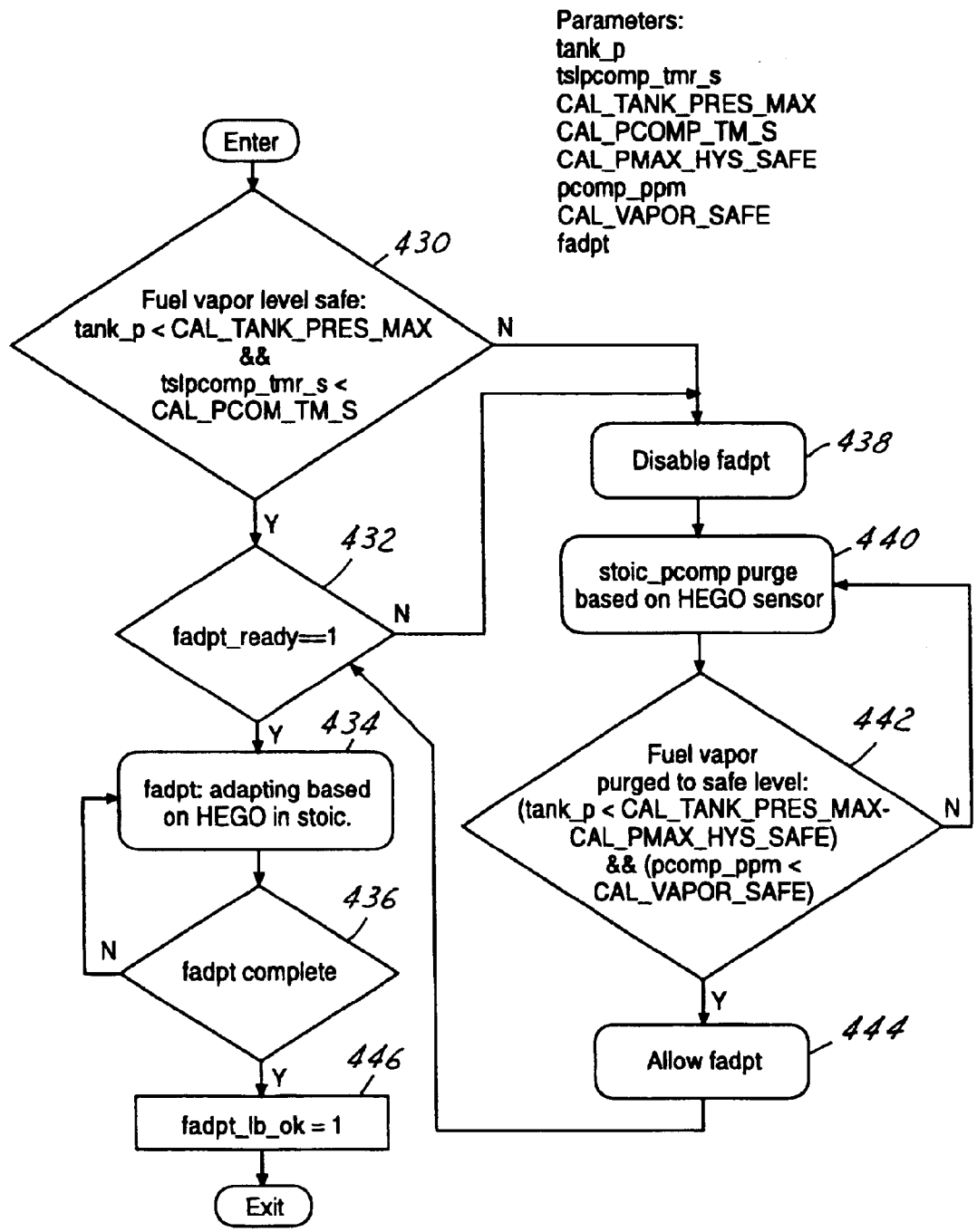

In steps 410, 412, and 416, the routine allows increased lean operation in between FADPT operation under certain conditions. In particular, in step 410, a determination is made as to whether the engine operation mode is stoichiometric, and FADTP is ready and this is the first operation of FADPT. If so, then the routine determines in step 412 if lean burn operation is ready; and if the timer (atmr) is less than a calibrated value. (CAL_ATMR). If not, lean operation is not allowed in step 414. The routine continues to step 422, where a process, as represented in FIG. 4A, is performed. FIG. 4A is basically fuel vapor purging and adaptive learning (HEGO based) in stoichiometric operation mode, as it will be described below.

If the answer to step 410 is NO, then the routine continues to step 416. Further, if the answer to step 412 is YES, the routine continues to step 416 as well. In step 416, a flag is set to allow lean burn operation from the fuel adaptive learning requirement.

Figure 4B:
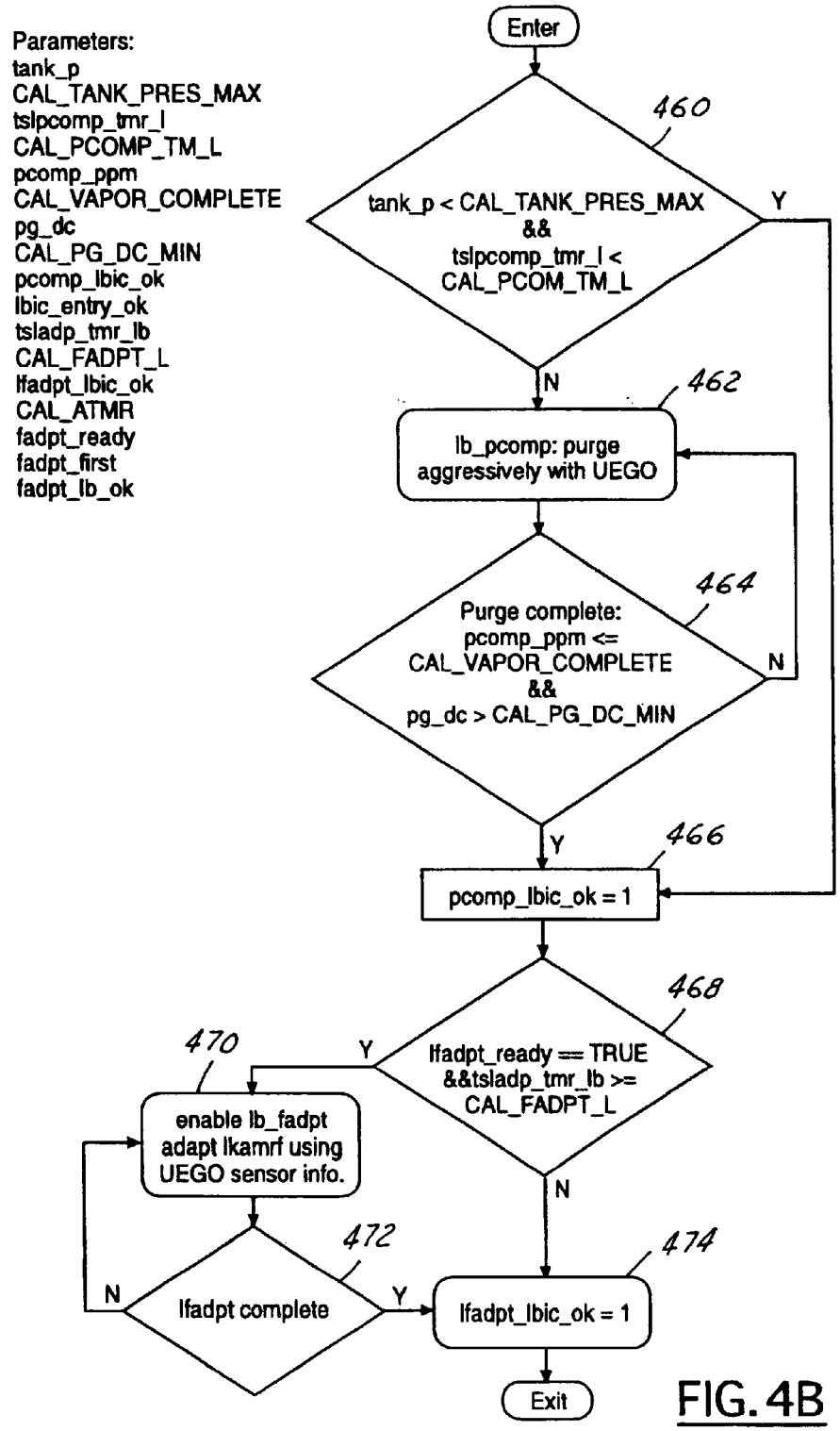

In step 418, which follows step 416, the routine determines the engine operation mode. If in step 418 the engine operation mode is determined to be lean burn but without injector cutout (LBIC), the routine continues to step 424, where a process, as represented in FIG. 4B, is performed. FIG. 4B is basically fuel vapor purging and lean fuel adaptive learning (UEGO based) in lean operation mode, as it will be described below.

Figure 4C:
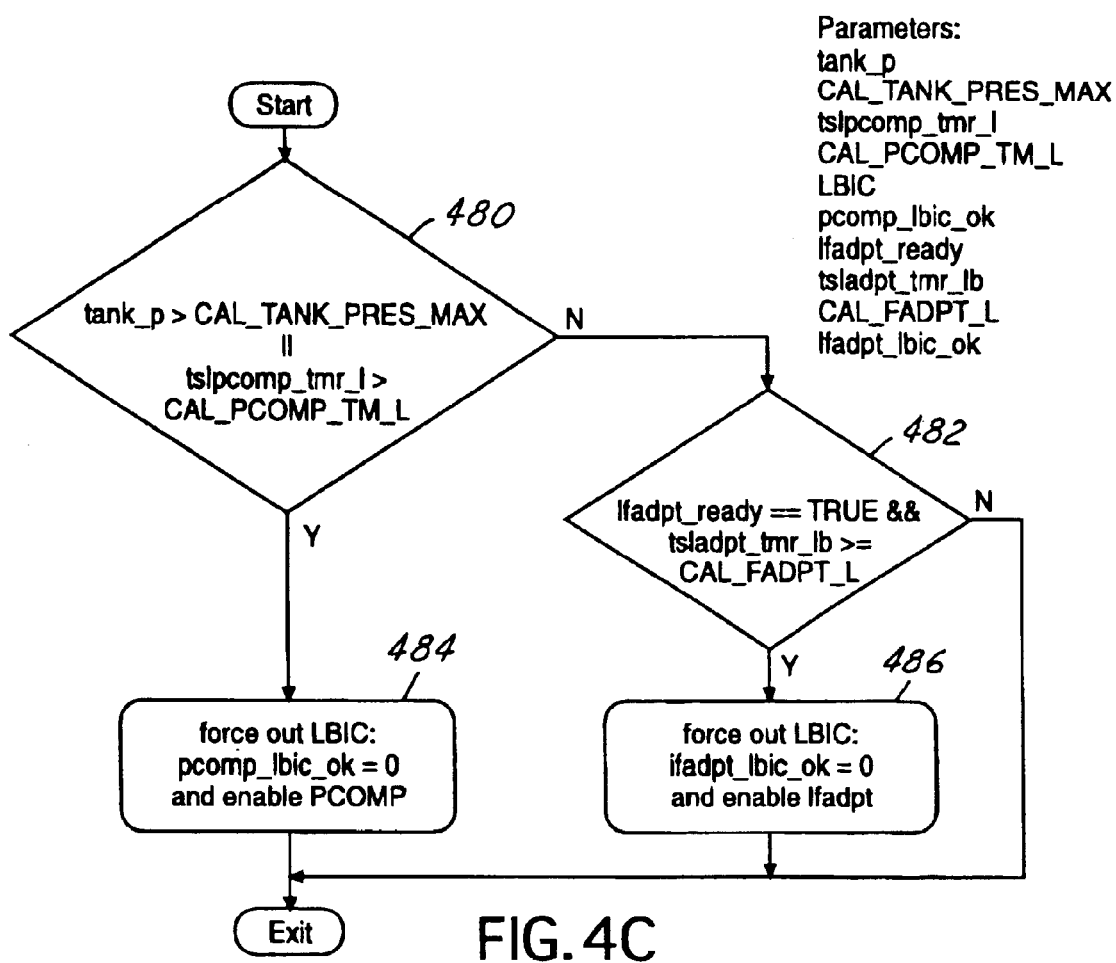

If the answer to step 418 is NO, the routine further checks if the operation mode is stoichiometric in step 420, which determines if the engine operation mode is stoichiometric. If the answer to step 420 is YES, the routine continues to step 422, which performs the process represented in FIG. 4A, as it will be described below. If the answer to step 420 is NO, it means the operation mode is LBIC (lean burn with injector cutout), the routine continues to step 426, which performs the process represented in FIG. 4C, as it will be described below. FIG. 4C is basically for determining whether the engine needs to exit LBIC mode based on fuel vapor and lean fuel adaptive learning requirements.

Referring now to FIG. 4A, which is the process defined in FIG. 4, step 422. In FIG. 4A, a routine for performing fuel vapor purging (stoichiometric) and adaptive function (FADPT) is now described. In particular, in step 430, the routine determines if it is safe not to perform fuel vapor purging, based on fuel tank pressure and time since last fuel vapor purging. When the answer to step 430 is NO, the routine continues to step 438. In step 438, the routine disables the adaptive fuel learning (FADPT), while enabling fuel vapor purging and fuel vapor purging learning (PCOMP). Next, the routine continues to step 440 where the routine operates the engine to induct fuel vapors from the fuel vapor system. Further, the routine learns the fuel vapor concentration as described below herein with particular reference to FIG. 6. In step 440, the routine allows for stoichiometric operation while performing the fuel vapor purging. From step 440, the routine continues to step 442. In step 442, the routine determines whether the tank pressure has fallen below a hysteresis calibration level which is lower than the threshold (CAL_TANK_PRES_MAX) and that the fuel vapor content is lower than a calibrated value (CAL_VAPOR_SAFE). When the answer to step 442 is "no," the routine returns to step 440 to continue fuel vapor purging and the fuel vapor concentration learning. Otherwise, when the answer to step 442 is yes, the routine continues to step 444, which allows fuel adaptive learning. Following step 444, the routine continues to step 432. Notice that routine continues to step 432 when the answer to step 430 is YES. In step 432, the routine checks if fuel adaptive learning is ready. When the answer to step 432 is NO, the routine continues to step 438, as described above. When the answer in step 432 is YES, the routine continues to step 434, where fuel adaptive learning is performed. The routine then continues to step 436 to check if fuel adaptive learning (stoichiometric operation) is complete. This is done by checking if adaptive learning timer (adap_tmr) is greater than a calibrated value (ADP_TM). When the answer to step 436 is NO, fuel adaptive learning in step 434 will continue. When the answer to step 436 is YES, a flag fadpt_lb_ok is set at step 446, which allows lean burn operation mode based on the statues of fuel adaptive learning.

Referring now to FIG. 4B, which is the process defined in FIG. 4, step 424. In FIG. 4B, a routine for performing lean burn fuel vapor purge and lean fuel adaptive learning, is now described. In particular, the routine starts at step 460, which determines whether it is allowed not to do fuel vapor purging. When the answer to step 460 is YES, the routine continues to step 466, where a flag is set, which allows lean burn with injector cutout (LBIC) operation with regard to fuel vapor purging requirement. When the answer to step 460 is NO, the routine continues to step 462, where fuel vapor purging is done aggressively based on UEGO sensor information as described below herein with regard to FIG. 6A. From step 462, the routine continues to step 464. In step 464, the routine determines whether the fuel vapor purging has been completed to a sufficiently low level. When the answer to step 464 is NO, the routine repeats fuel vapor purging at step 462. When the answer to step 464 is YES, the routine continues to step 466. Following step 466, the routine continues to step 468, where a determination is made as to whether the lean fuel adaptive learning is ready and it is necessary to perform lean fuel adaptive learning. When the answer to step 468 is YES, the routine continues to step 470, where lean fuel adaptive learning is performed. Following step 470, the routine continues to step 472, which checks if lean fuel adaptive learning is ready. When the answer to step 472 is NO, the routine repeats lean fuel adaptive learning at step 470. When the answer to step 472 is YES, the routine continues to step 474. Notice that when the answer to step 468 is NO, the routine continues to step 474 as well. In step 474, a flag is set, which allows lean burn with injector cutout (LBIC) operation with regard to lean fuel adaptive learning requirement.

Referring now to FIG. 4C, which is the process defined in FIG. 4, step 426. In FIG. 4C, a routine for determining fuel vapor purging and lean fuel adaptive learning associated with LBIC operation, is now described. In particular, in step 480, a determination is made as to whether it is necessary to exit LBIC mode to perform fuel vapor purging based on the consideration of fuel economy. When the answer to step 480 is YES, the routine continues to step 484. In step 484, a flag is set to disallow LBIC and the engine operation mode will be forced back to lean burn. When the answer to step 480 is NO, the routine continues to step 482. In step 482, a determination is made as to whether it is necessary to exit LBIC mode to perform lean fuel adaptive learning. When the answer to step 482 is YES, the routine continues to step 486. In step 486, a flag is set to disallow LBIC and the engine operation mode will be forced back to lean burn. When the answer to step 482 is NO, conditions allowing LBIC mode from fuel vapor purging and lean fuel adaptive learning are met and the process will repeat.

The procedure and processes described in FIG. 4, FIG. 4A, FIG. 4B, and FIG. 4C can be summarized into a high level diagram, as represented in FIG. 4D.

Referring to FIG. 4D, which gives a high level description of the activities described in FIG. 4, FIG. 4A, FIG. 4B and FIG. 4C. In particular, in block 490, which represents stoichiometric mode, a transition from stoichiometric mode to lean burn mode is made possible when lean burn entry conditions are met and fuel adaptive learning allows lean burn operation (reference to FIG. 4, FIG. 4A and FIG. 4B). In block 492, which represents lean burn without injector cutout mode, a transition from lean burn to lean burn with injector cutout mode (LBIC) is made possible if LBIC entry conditions are met, and that fuel vapor purging and lean fuel adaptive learning requirements allow LBIC operation (reference to FIG. 4, FIG. 4B and FIG. 4C). Again in block 492, a transition from lean burn to stoichiometric is made possible if lean burn entry conditions are not met, or fuel adaptive learning does not allow lean burn operation (reference to FIG. 4 and FIG. 4A and FIG. 4B). In block 494, which represents LBIC operation, a transition to lean burn without injector cutout is made possible when LBIC entry conditions are not met, or fuel vapor purging requirement does not allow LBIC operation, or lean fuel adaptive learning does not allow LBIC operation (reference to FIG. 4, FIG. 4B and FIG. 4C).

Figure 4E:
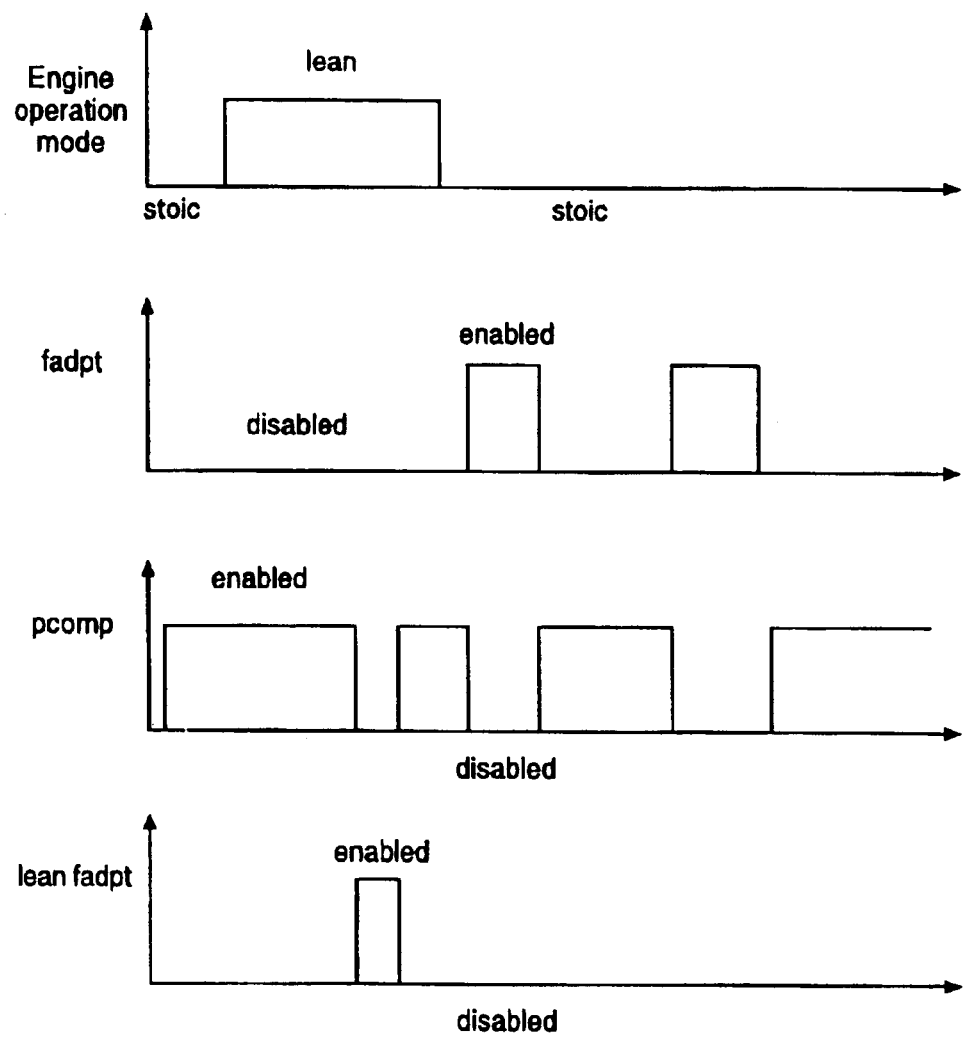
Figure 4F:
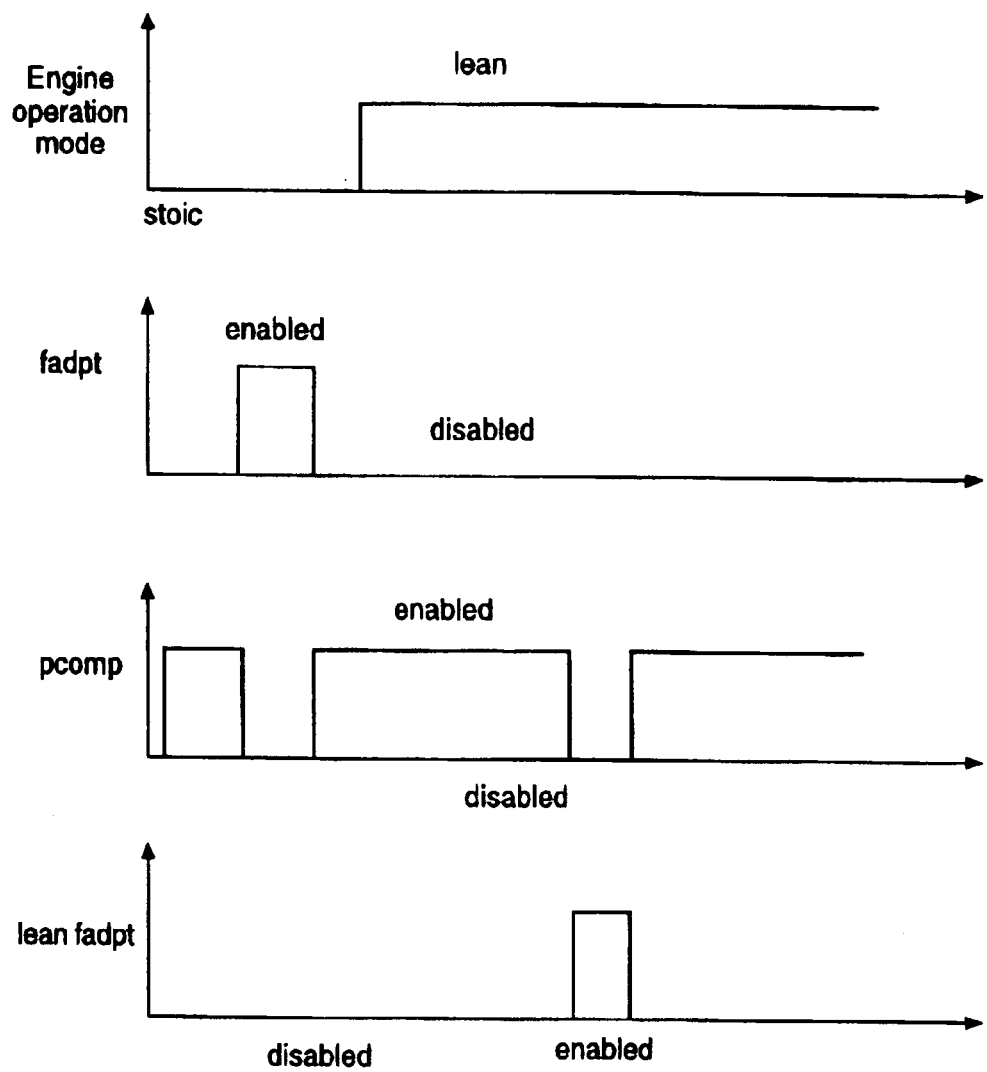

Representative running for a limited lean system is shown in FIG. 4E. For this kind of system, lean operation opportunity is very limited, and it is thus necessary to defer stoichiometric fuel adaptive learning when it is possible (reference to FIG. 4, step 410, step 412 and step 416). A comparative representative running for a high capacity lean system is shown in FIG. 4F. For this system, lean operation opportunity abounds and there is no need to defer stoichiometric fuel adaptive learning. Considerations of these two different systems can be realized through calibration, reference to FIG. 4, step 412.

Figure 5:
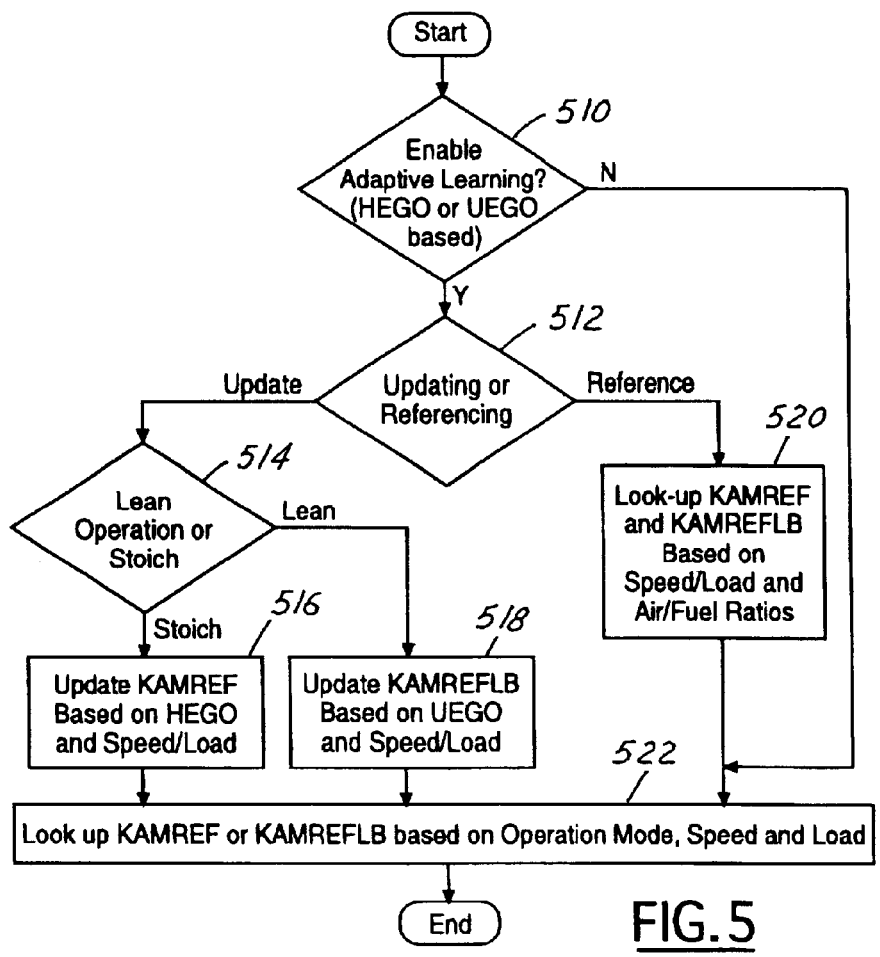
FIGS. 3, 5–6, and 8–10 are high level flowcharts illustrating various embodiments of the present invention.

Referring now to FIG. 5, a routine for performing adaptive functions (LADPT and FADPT) is now described. In particular, in step 510, the routine determines whether adaptive learning is enabled, based on various conditions such as air charge temperature, engine coolant temperature, throttle position, mass air flow, engine load, feedback air-fuel control mode (open or closed loop), and various other conditions. When the answer to step 510 is YES, the routine continues to step 514 where a determination is made as to whether the engine is operating in stoichiometric operation mode. When the answer to step 514 is YES, the routine continues to step 516 and learns adaptive data (e.g., KAMREF) based on the HEGO sensor for each speed/load range. The routine then continues to step 520 where the routine looks up KAMREF for stoichiometric operation. When the answer to step 514 is NO, the routine continues to step 522, where a determination is made as to whether the operation mode is LBIC. When the answer to step 522 is YES, it is LBIC mode, thus no fuel adaptation is made and the routine continues to step 520, where the routine looks up LKAMREF. When the answer to step 522 is NO, it is lean burn without injector cutout mode, the routine continues to step 518 and learns adaptive data (e.g., LKAMREF) based on the UEGO sensor for each speed/load range. Following step 518, the routine continues to step 520, where the routine looks up LKAMREF. Finally, when the answer to step 510 is NO, the routine continues to step 520, where the routine looks up KAMREF or LKAMREF based on engine operation mode, speed and load.

The PCOMP enabling logic generally works as follows, with particular reference to FIG. 6 (for stoichiometric operation mode), and FIG. 6A (for lean burn mode).

Figure 6:
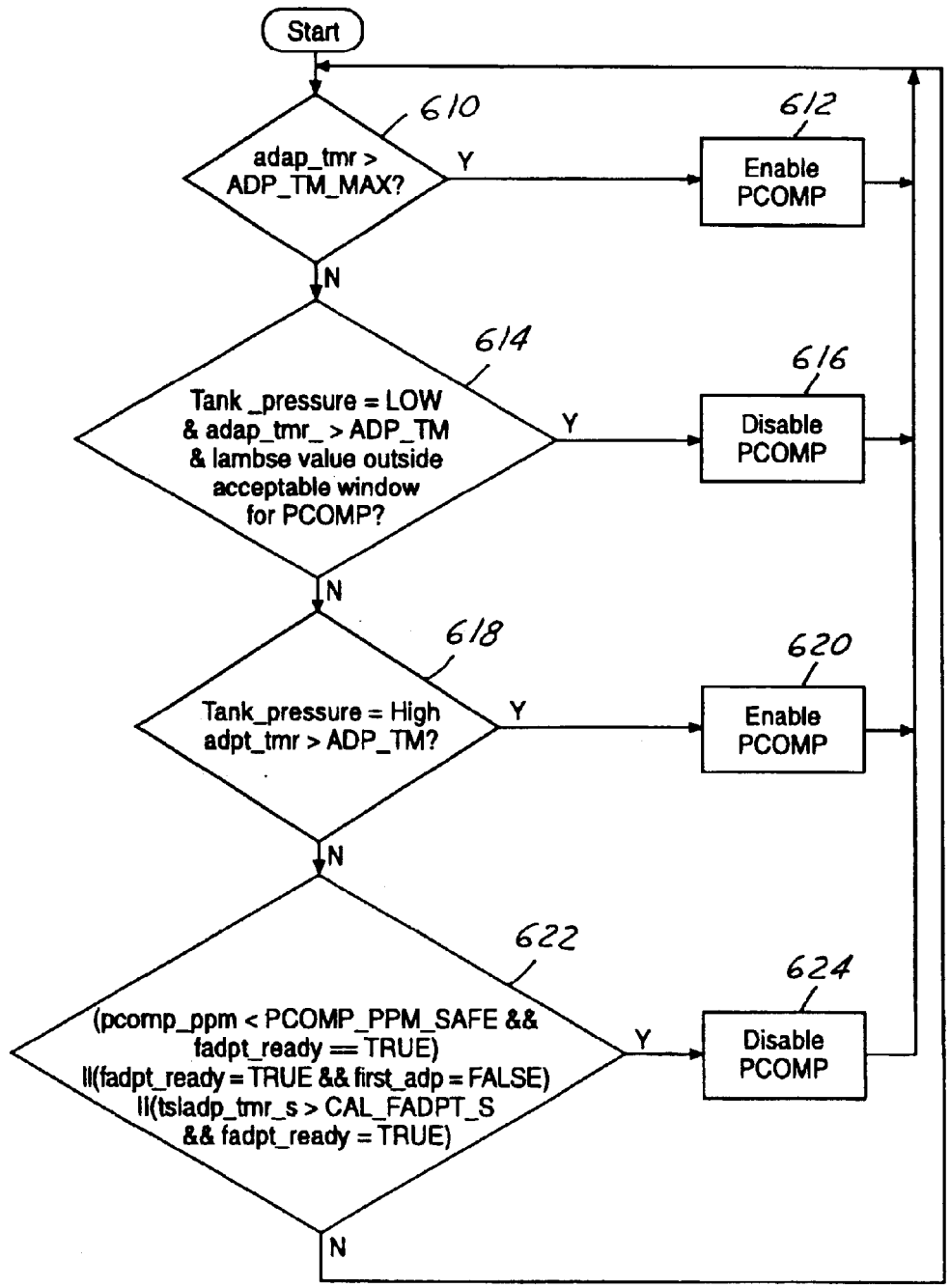

Referring now to FIG. 6. First, in step 610, a determination is made as to whether FADPT has run over timer limit ADP_TM_MAX, by checking the timer (adap_tmr). If the answer to step 610 is YES, then PCOMP is enabled (and FADPT is disabled) in step 612. Otherwise, in step 614 a determination is made as to whether fuel tank pressure is low (below a preselected pressure value), FADPT has run over a certain timer ADP_TM (which is less than time ADP_TM_MAX), and the lambse value (desired air-fuel ratio value) is outside an acceptable window. If the answer to step 614 is YES, then PCOMP is disabled in step 616. Otherwise, the routine continues to step 618.

In step 618, the routine determines whether fuel tank pressure is high or FADPT has run over a certain timer ADP_TM. If the answer to step 618 is YES, then PCOMP is enabled in step 620. Otherwise, in step 622, the routine determines whether fuel vapor content is lower than a safe level, and that fuel adaptive learning is ready; or FADPT has not been performed even once (first_adpt=FALSE), and fuel adaptive learning is ready; or time since last fuel adaptive learning is larger than a time limit (CAL_FADPT_S) by checking a timer (tsladp_tmr_s), and fuel adaptive learning is ready. When the answer to step 622 is YES, then PCOMP is disabled in step 624.

The routine of FIG. 6 is generally executed in background timing in controller 12, and as described above, enables and disables PCOMP. The control of the fuel vapor purge is described in more detail below with particular reference to FIG. 8.

Figure 6A:
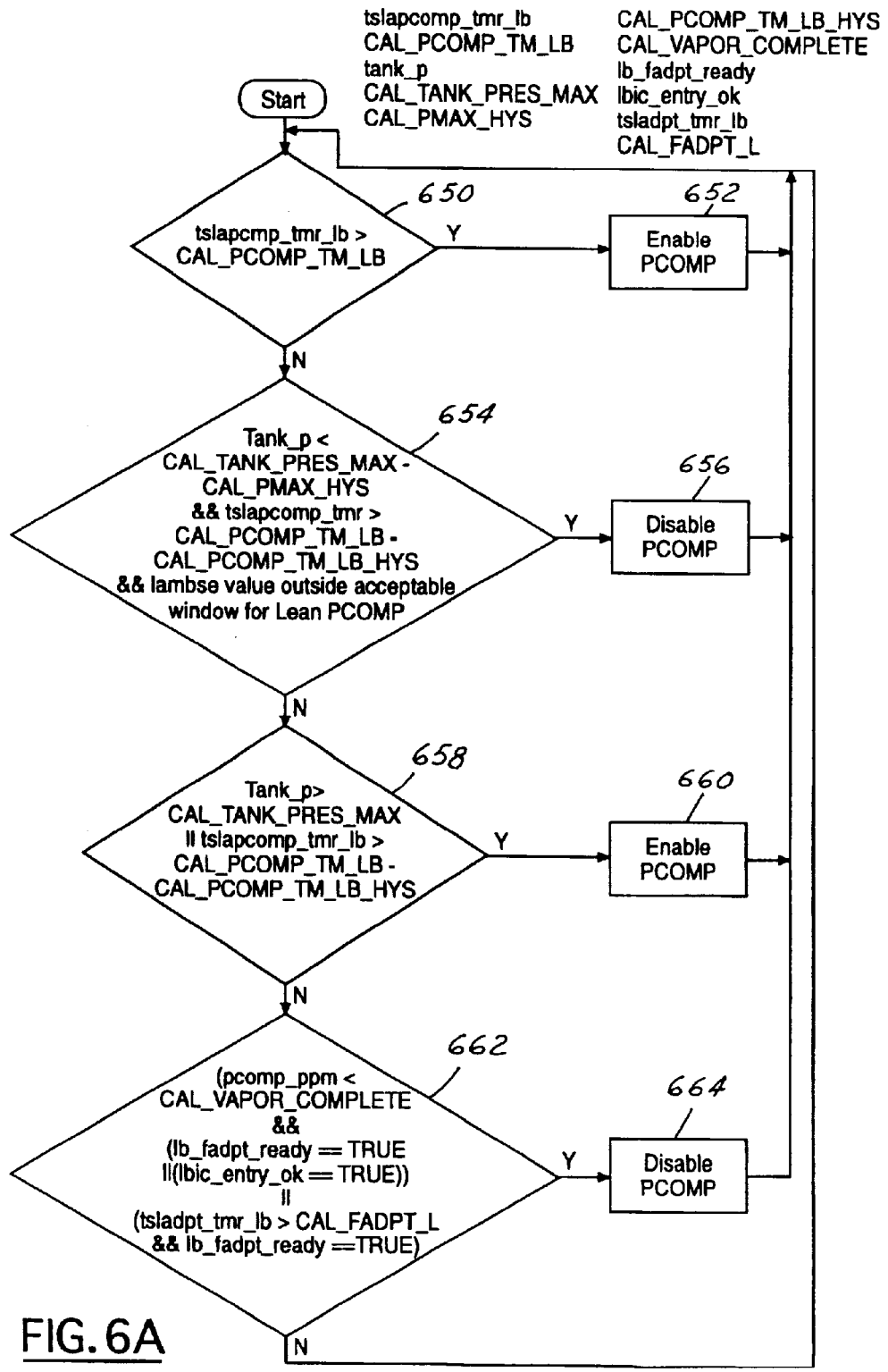

Referring now to FIG. 6A. First, in step 650, a determination is made as to whether time since last fuel vapor purging has run over timer limit CAL_PCOMP_TM_LB by checking the timer (tslapcomp_tmr_lb). If the answer to step 650 is YES, then PCOMP is enabled (and Lean FADPT is disabled) in step 652. Otherwise, in step 654 a determination is made as to whether fuel tank pressure is low (below a pre-selected pressure value), time since last fuel vapor purging has run over a certain timer CAL_PCOMP_TM_LB–CAL_PCOMP_TM_LB_HYS (which is less than time CAL_PCOMP_TM_LB), and the lambse value (desired air-fuel ratio value) is outside an acceptable window. If the answer to step 654 is YES, then PCOMP is disabled in step 656. Otherwise, the routine continues to step 618.

In step 658, the routine determines whether fuel tank pressure is high or time since last fuel vapor purging has run over a certain timer CAL_PCOMP_TM_LB–CAL_PCOMP_TM_LB_HYS. If the answer to step 658 is YES, then PCOMP is enabled in step 660. Otherwise, in step 662, the routine determines whether fuel vapor content is lower than a sufficiently purged level, and that fuel adaptive learning is ready, or LBIC entry condition is ready; or time since last lean fuel adaptive learning is larger than a time limit (CAL_FADPT_L) by checking a timer (tsladp_tmr_lb), and fuel adaptive learning is ready. When the answer to step 662 is YES, then PCOMP is disabled in step 664.

The routine of FIG. 6A is generally executed in background timing in controller 12, and as described above, enables and disables PCOMP. The control of the fuel vapor purge is described in more detail below with particular reference to FIG. 8.

Figure 7:
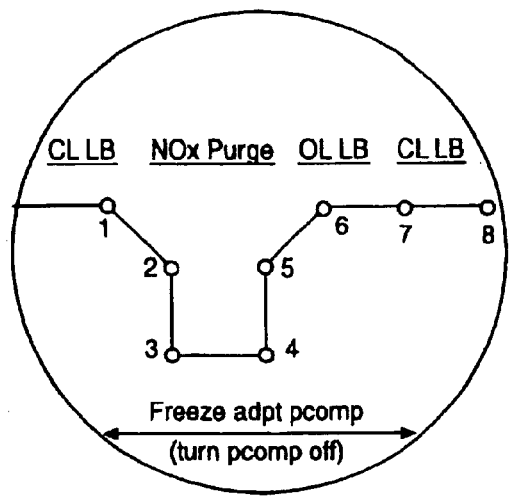
FIG. 7 shows a sequence of different operating modes according to one embodiment of the present invention.

Referring now to FIG. 7, a graph shows the $NO_X$ purge cycle where the engine switches between lean to stoichiometric or rich operation to purge $NO_X$ stored in the emission control devices. As shown in FIG. 7, the engine is first operated in the closed loop lean burn mode where the engine air-fuel ratio is controlled to a lean value based on the downstream UEGO sensor. As shown in point 1, the routine transitions from closed loop lean operation to a desired rich air-fuel ratio at point 2 and then transitions to a second desired rich air fuel ratio at point 3 and continues at that air fuel ratio until point 4. Then, at point 4, the routine reduces the air-fuel ratio towards stoichiometry at point 5 and continues to the desired lean air-fuel ratio at point 6 in an open loop fashion. At point 7, the routine continues to close loop lean burn operation and thereby continues lean operation until point 8 and beyond. Between points 1 and 7, the routine freezes the learned fuel vapor concentration value (PCOMP_PPM) and disables updating this value during this period. Alternatively, during the points 1 to 7 in an alternate embodiment the routine completely disables the fuel vapor concentration learning and disables fuel vapor purging during this period. However, as described above, it is possible to continue the fuel vapor purging during the rich operation, or rich cycle of the $NO_X$ lean/rich cycle. This is described more specifically below with regard to the routine of FIG. 9.

Figure 8:
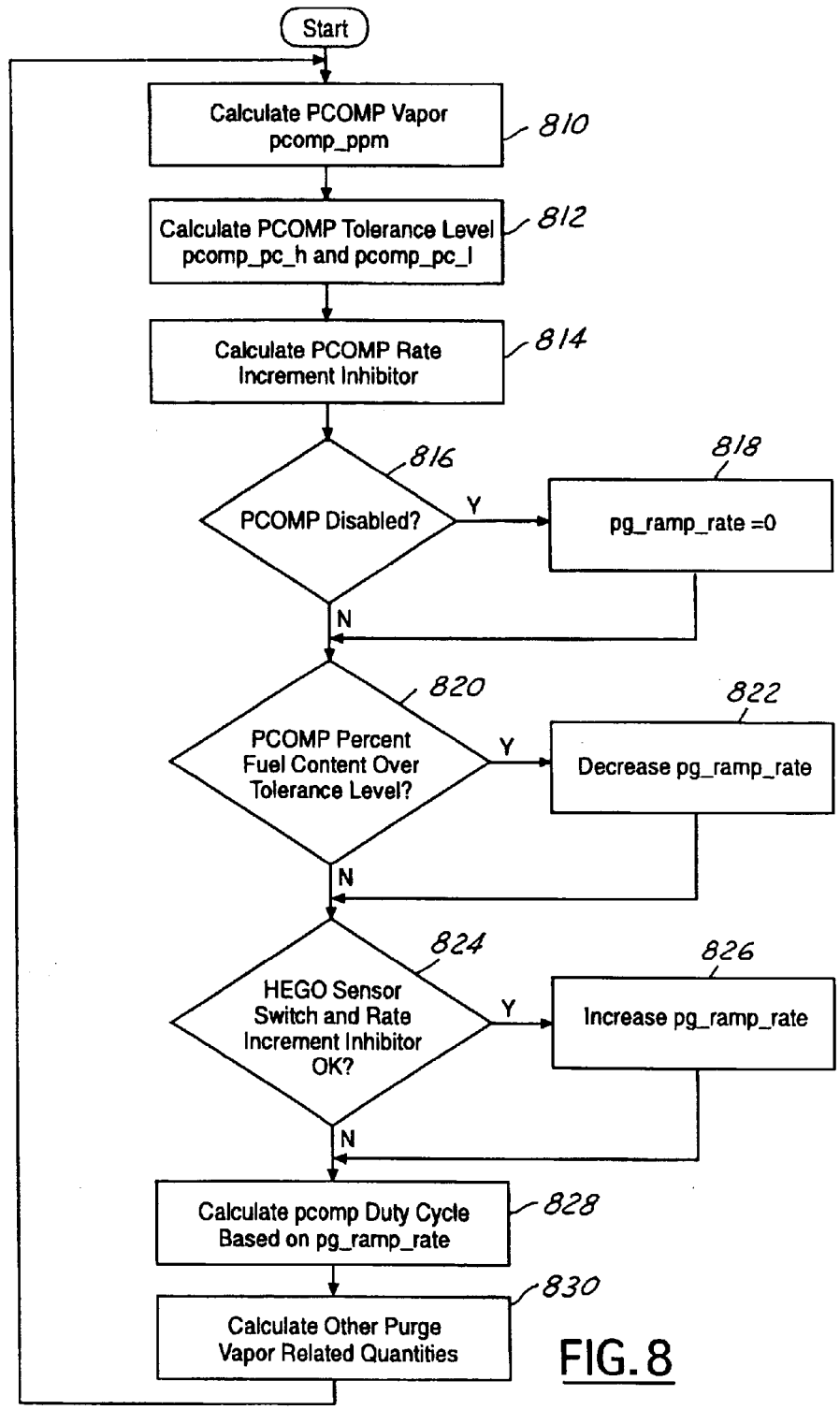

Referring now to FIG. 8, a routine for controlling fuel vapor purging is described. Specifically, the case of stoichiometric PCOMP is described. However, changes and adjustments are indicated to also describe lean burn fuel vapor purging control using the UEGO sensor rather than, or in addition to, the HEGO sensor.

Note that when purging fuel vapors, adaptive fuel is frozen, so the kamref (Keep Alive Memory learned adaptive value) is not updated (although it is still calculated based on engine speed and load).

First, in step 810, the routine calculates a PCOMP vapor amount (pcomp_ppm). Then, in step 812, the routine calculates a tolerance level within which the purge vapor concentration should be maintained. These are calibratable values based on engine and vehicle testing.

Next, in step 814, the routine calculates a rate increment inhibitor, which limits the rate at which the fuel vapor valve can be adjusted. Next, in step 816, the routine determines whether PCOMP is disable. If so, in step 818 the ramp rate (pg_ramp_rate) is set to zero. Otherwise, the routine continues to step 820.

In step 820, the routine determines whether the PCOMP percent fuel content is greater than the upper tolerance level. If so, the ramp rate is decreased in step 822. Otherwise, in step 824, the routine determines, for stoichiometric operation, HEGO sensor switching. HEGO switching is used to control the purge rate ramping. If switching is seen, it indicates that purge vapor fuel is within limit and it is OK to increase the purge rate in step 826. On the other hand, if a percentage of PCOMP over fuel is seen as greater than a limit, then purge rate is ramped down.

There are also special cases, for example no HEGO switching for an extended period of time, when PCOMP is disabled (duty cycle set to zero).

For lean operation, the common points for PCOMP are that adaptive fuel is frozen, and that the philosophy for ramping purge duty cycle remains the same. However, instead of using the HEGO sensor switching signal for incrementing purge rate, a UEGO sensor signal from downstream of the second catalyst can be used. In other words, rather than using HEGO switching, the routine can determine if the difference between the downstream UEGO value and the desired lean air-fuel ratio is less than a threshold. If so, then the purge is within tolerance.

Figure 9:
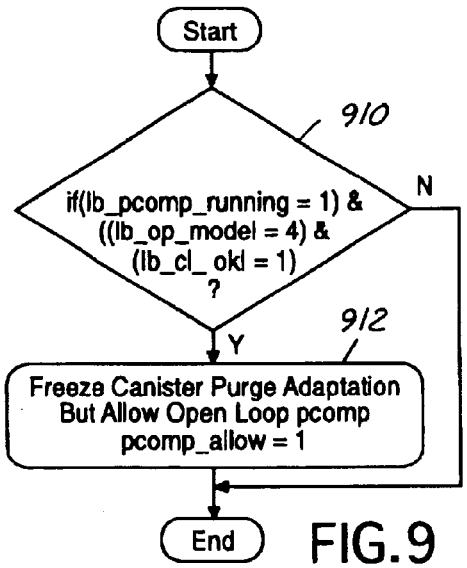

Referring to FIG. 9, the routine is described for controlling the canister purging and lean fuel vapor concentration learning during a $NO_X$ purge cycle. First, in step 910, the routine determines whether the lean burn fuel vapor concentration learning routine is operating and whether the engine is operating in the lean burn close loop air-fuel ratio control condition. When the answer to step 910 is "yes", the routine continues to step 912. In step 912, the routine freezes the canister purge adaptation but allows for open loop fuel vapor concentration adjustment if the fuel vapor purging is continued during the $NO_X$ purge. In other words, the routine disables adaptive learning of the fuel vapor concentration based on the UEGO sensor during the rich engine air-fuel ratio. However, the routine continues to adjust the injected fuel amount based on the last updated value of the fuel vapor concentration. In this way, the routine can maintain the desired rich air-fuel ratio even in the presence of the fuel vapor purging. Since the rich operation to purge the $NO_X$ stored in the emission control device is relatively short, there is only a generally small change in the fuel vapor concentration during this short period, therefore the open loop estimate based on the last updated fuel vapor concentration allows for accurate engine air-fuel ratio control.

Note that various calibration switches can be added to the routine of FIG. 9 to allow such a feature to be enabled or disabled.

Figure 10:
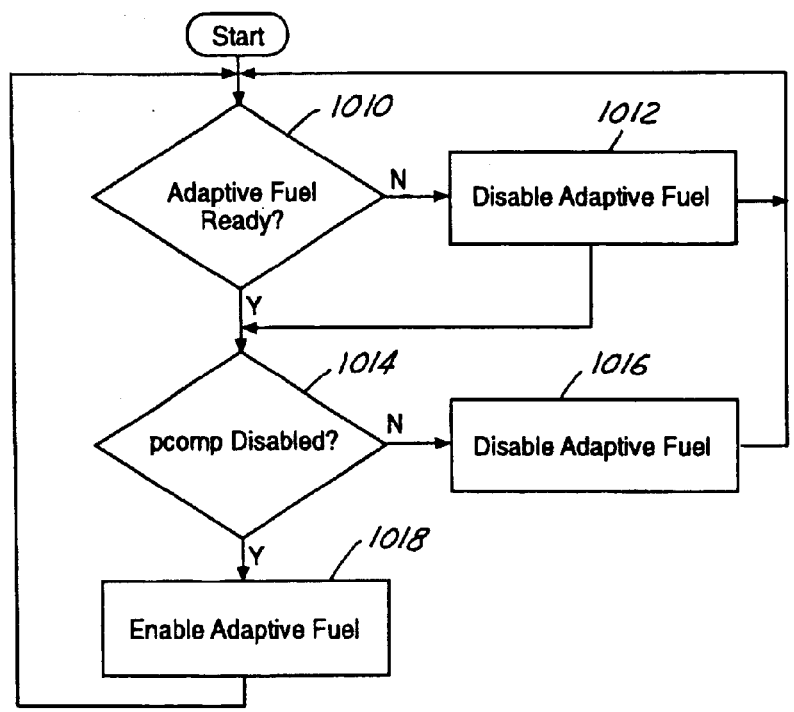

Referring now to FIG. 10, a routine is described to illustrate the interaction between adaptation and fuel vapor learning. First, in step 1010, the routine determines whether the adaptive routines are ready. If not, the routine disables adaptation in step 1012. Otherwise, in step 1014, a determination is made whether PCOMP is disabled. If not, adaptation is disabled in step 1016. When the answer to step 1014 is YES, the routine enables adaptive fuel in step 1018.

As will be appreciated by one of ordinary skill in the art, the routines described above represent a pictorial of code that can be programmed into a computer such as controller 12. The flowcharts may represent one or more of any number of processing strategies such as event-driven, interrupt-driven, multi-tasking, and the like. As such, various steps or function illustrated may be performed in the sequence illustrated, in parallel, or in some cases omitted. Likewise, the order of processing is not necessarily required to achieve the features or advantages of the different embodiments of the invention, but is provided for ease of illustration, and description. Further, these Figures graphically represent code to be programmed into the computer readable storage medium in controller 12.

This concludes the detailed description. Various embodiments and different aspects have been described. The scope of the invention is therefore defined by the following claims:

We claim:

1. An electronic control device for a vehicle, comprising:
   a computer storage medium having a computer program encoded therein for controlling an internal combustion engine coupled to an emission control device and a sensor, the engine also coupled to a fuel vapor storage device, said computer storage medium comprising:
   code for operating the engine lean with periodic rich operating durations;
   code for during at least said lean operation with periodic rich operation, learning a fuel vapor amount from said fuel vapor storage device based on the sensor, wherein fuel vapor is combusted in the engine at least during a part of the lean and rich operation;
   code for operating the engine at near stoichiometric operating conditions; and
   code for during at least said stoichiometric conditions, learning adaptive data.

2. The method recited in claim 1 wherein said sensor is a HEGO sensor coupled upstream of the emission control device.

3. The method recited in claim 1 wherein said sensor is a UEGO sensor coupled downstream of the emission control device.

4. The method recited in claim 1 further comprising code for learning said adaptive data based on said sensor.

5. A method for controlling an engine coupled to a fuel system having a fuel tank, the method comprising:
   operating the engine with a first group of cylinders inducting air with substantially no injected fuel, and a second group of cylinders inducting air and receiving injected fuel;
   determining whether pressure in the tank is greater than a threshold value;
   in response to said determination, disabling said operation, and operating all of the cylinders to combust air and fuel, said cylinders also combusting inducted fuel vapors from the tank; and
   learning a fuel vapor amount based on a sensor.

6. The method recited in claim 5 wherein said first group of cylinders is equal to said second group of cylinders.

7. The method recited in claim 5 wherein said sensor is a UEGO sensor.

8. The method recited in claim 5 wherein said sensor is a HEGO sensor.

9. The method recited in claim 5 wherein said air with substantially no injected fuel and said air with injected fuel mix in an exhaust component.

10. The method recited in claim 5 wherein during the combusting of all of the engine cylinders, the overall mixture of air to fuel in the cylinders is lean of stoichiometry.

11. The method recited in claim 5 wherein said second group of cylinders with air and injected fuel operates lean of stoichiometry.

12. A system comprising:
   an emission control device capable of storing NOx during at least some operating conditions; and
   a controller programmed to operate an engine lean at least during a light load operation; during at least a portion of said lean operation, operate the engine to induct fuel vapors; and while inducting said fuel vapors, switching the engine to stoichiometric or rich operation to react NOx stored in said emission control device.

* * * * *